United States Patent [19]

Koshiishi et al.

[11] Patent Number: 5,527,641

[45] Date of Patent: Jun. 18, 1996

[54] COATED METAL SHEET FOR DRY CELL POSITIVE ELECTRODE CAN AND POSITIVE ELECTRODE CAN FORMED OF SUCH METAL SHEET

[75] Inventors: Kenji Koshiishi, Ichikawa; Kazuyuki Hiraoka, Kawasaki; Keiichi Sawaya, Ichikawa; Kenji Ogawa, Ichikawa; Toshio Nagatomo, Ichikawa; Taketo Uesugi; Masaaki Kurimura, both of Moriguchi; Kazuhiro Shikada, Osaka; Kunio Hoshi, Tokyo; Toru Kobayashi, Tokyo; Masanobu Koda, Tokyo, all of Japan

[73] Assignees: Nisshin Steel Co., Ltd., Tokyo; Sanyo Electric Co., Ltd.; Sanyo Excell Co., Ltd., both of Osaka, all of Japan

[21] Appl. No.: 335,824

[22] PCT Filed: Mar. 15, 1994

[86] PCT No.: PCT/JP94/00408

§ 371 Date: Nov. 16, 1994

§ 102(e) Date: Nov. 16, 1994

[87] PCT Pub. No.: WO94/22174

PCT Pub. Date: Sep. 29, 1994

[30] Foreign Application Priority Data

Mar. 17, 1993 [JP] Japan .................... 5-082791

[51] Int. Cl.$^6$ .................................................. H01M 2/02
[52] U.S. Cl. .................... 429/163; 429/164; 429/167; 429/176; 429/177; 428/469
[58] Field of Search ........................ 429/163, 164, 429/167, 177, 176; 428/469

[56] References Cited

U.S. PATENT DOCUMENTS 4,608,323  8/1986  Zaborney ................... 429/167

FOREIGN PATENT DOCUMENTS

| 55-33753 | 9/1980 | Japan . |
| 61-208747 | 9/1986 | Japan . |
| 61-227178 | 9/1986 | Japan . |
| 3-161333 | 11/1991 | Japan . |

OTHER PUBLICATIONS

Japanese koki, 56–130071, Oct. 12, 1981, Sodium–Sulfur Battery; komata, et al.

Japanese kokai, 61–91367, May 9, 1986, Steelsheet for coating Used as can Stock, hara et al.

Japanese Patent Abstract, JP 3–216952, Sep. 24, 1991.

Japanese Patent Abstract, JP 4–198271, Jul. 17, 1992.

Japanese Patent Abstract, JP 58–48361, Mar. 22, 1983.

Japanese Patent Absract, JP 59–160959, Sep. 9, 1984, 107 E 290.

*Primary Examiner*—Stephen Kalafut
*Assistant Examiner*—Richard H. Lilley, Jr.
*Attorney, Agent, or Firm*—Foley & Lardner

[57] ABSTRACT

A coated metal sheet for alkaline dry cell positive electrode cans, comprising a metal sheet covered via a chromate film, preferably a chromate film containing carbon black, with a coating film mainly composed of at least one of an epoxy resin, an epoxy-acrylic resin and a polyester resin, containing at least one of graphite powder having a purity of not less than 95%, an aspect ratio of not less than 50 and an average particle diameter of not larger than 50 μm and carbon black having an oil absorption of not less than 250 ml/100 g as measured using DBP, or a coating film further incorporated with a cross-linking agent. This coated metal sheet may be only worked by drawing to produce the positive electrode cans.

14 Claims, 3 Drawing Sheets

COATED METAL SHEET FOR DRY CELL POSITIVE ELECTRODE CAN AND POSITIVE ELECTRODE CAN FORMED OF SUCH METAL SHEET

TECHNICAL FIELD

This invention relates to a coated metal sheet that makes it possible to produce alkaline dry cell positive electrode cans (or anode cans) by only machining, and a positive electrode can produced using such a metal sheet.

BACKGROUND ART

Alkaline dry cells are hitherto used in low-voltage (1.5 V) power sources of strobes, shavers, table clocks, acoustic and electronic equipment and so forth. Positive electrode cans used in such cells are those produced by punching out a coated steel sheet such as a cold-rolled steel sheet or a double-side Ni-coated steel sheet and working the resulting sections by multiple drawing into desired forms (in many instances, cylinders). However, positive electrode cans made of such materials have the problems that their inside surfaces come into contact with high-concentration electrolytes and positive electrode mixtures to form oxide layers on the surfaces of the positive electrode cans, causing a lowering of cell characteristics such as short-circuit current and electromotive force as time lapses.

Now, as a countermeasure for such a problem, a method has been proposed in which the inside surface of a positive electrode is directly coated with a conductive coating composition mixed with a carbon type conductive agent in a large quantity of, e.g., 100 to 300 parts by weight based on 100 parts by weight of resin so that its corrosion resistance can be improved. This is a method in which a carbon type conductive agent as exemplified by graphite powder or acetylene black is mixed into a coating composition comprising a resin with a good alkali resistance such as polyvinyl isobutyl ether or vinyl acetate resin and the resulting coating composition is applied to the inside surface of a positive electrode can (Japanese Patent Applications Laid-open No. 58-48361 and No. 59-160959).

Application of this conductive coating composition, however, must be carried out without pretreatment of positive electrode cans and by a very cumbersome operation of spray-coating or brush-coating them one by one followed by drying, and hence has had a poor productivity. In addition, since the positive electrode cans are small in diameter and nevertheless deep, it has been very difficult from a technical viewpoint to uniformly coat the inside surfaces. Accordingly, it has been sought to provide a material from which positive electrode cans with a good quality can be efficiently produced by only machining.

Inexpensive materials that can meet such demands may include coated steel sheets previously coated with a conductive coating composition. However, the conductive coating composition as mentioned above must be mixed with the conductive agent in a large content and hence may have a poor adhesion of resin to steel sheet to cause separation or break of coating films when worked by drawing.

As other conductive coating compositions, a low electrical resistance coating composition containing graphite powder and carbon black is known in the art (Japanese Patent Publication No. 55-33753). It is disclosed that this coating composition can be made to have a low electrical resistance when graphite powder and carbon black are mixed in an amount of 20 to 1,000 parts by weight in total, based on 100 parts by weight of resin, the proportion of graphite powder to carbon black is controlled in the range of the former/the latter= 90/10 to 10/90, and a flaky graphite powder with particle diameters of 0.1 μ to scores of microns and carbon black with particle diameters of 10 to 30 mμ are used as the graphite powder and the carbon black. It is also disclosed that all sorts of resins can be used for binders of conductive agents so long as they can be usually used as coating materials, which may include thermoplastic resins such as a vinyl chloride-vinyl acetate copolymer and cellulose derivatives and thermosetting resins such as acrylic resins and epoxy resins.

Since, however, this coating composition attaches importance to conductivity, it may cause separation of coating films if the conductive agents are mixed in an amount of 100 to 300 parts by weight based on 100 parts by weight of the resin as in the case of the coating compositions disclosed in Japanese Patent Applications Laid-open No. 58-48361 and No. 59-150959.

A first object of the present invention is to provide a coated metal sheet containing graphite powder or carbon black, or both of them, in a coating film, and from which alkaline dry cell positive electrode cans can be produced by only mschining.

Another object of the present invention is to provide an alkaline dry cell positive electrode can having a superior corrosion resistance.

DISCLOSURE OF THE INVENTION

The coated metal sheet of the present invention comprises a metal sheet covered with a resin coating film having superior alkali resistance and workability, containing at least one of graphite powder and carbon black so as for the coating film to have well balanced conductivity and workability so that positive electrode cans can be produced by only machining. The coated metal sheet is characterized by a metal sheet having a chromate film and covered thereon with a coating film mainly composed of at least one of an epoxy resin, an epoxyacrylic resin and a polyester resin, containing a conductive agent comprising at least one of graphite powder having a purity of not less than 95%, having been made flaky to have an aspect ratio of not less than 50 and having an average particle diameter of not larger than 50 μm and carbon black having an oil absorption of not less than 250 ml/100 g as measured using DBP (dibutyl phthalate). The coating film may be further incorporated with a cross-linking agent. The positive electrode can is also characterized by a dry cell positive electrode can having a chromate film on its inside surface and a coating film formed thereon which contains carbon black and graphite powder; the can being produced by working the above coated metal sheet by drawing.

The coated metal sheet of the present invention utilizes the conductive agent as a lubricant when worked by drawing and utilizes it as a conductive agent itself after worked into positive electrode cans. More specifically, when it is worked by drawing in the manner its coating surface forms the inside surfaces of the cans, the conductive agent graphite powder or carbon black acts as a lubricant and also the conductive agent is incorporated in an amount not so large as to damage the workability of the coating film, and hence the coating film can be uniformly stretched together with the chromate film while it comes into firm adhesion to the metal sheet. Therefore the inside surfaces of positive electrode cans can have uniform coating film thickness, conductive agent distribution and corrosion resistance when the metal sheet is worked into positive electrode cans, so long as a metal sheet having uniform coating film thickness and conductive agent distribution, produced by roll coating or the like, is used as the coated metal sheet. Thus, positive electrode cans can be produced by only machining carried out when conventional positive electrode cans are produced, and the production process can be greatly rationalized.

BEST MODE FOR WORKING THE INVENTION

Figure 1:
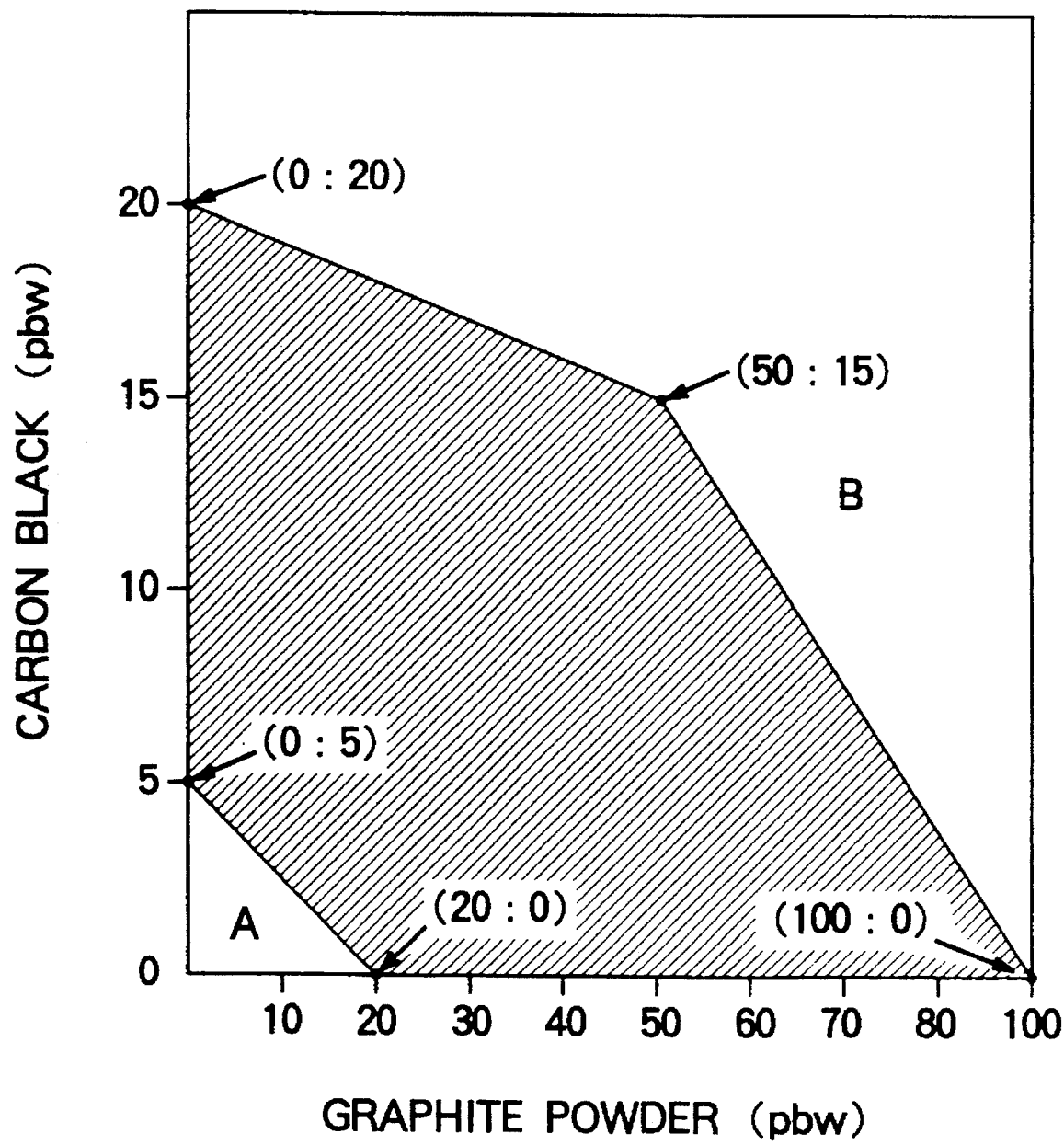
FIG. 1 is a graph showing the range of amount in which graphite powder and/or carbon black is/are mixed based on 100 parts by weight of resin according to the present invention.

The coating film in the present invention is mainly composed of at least one of an epoxy resin, an epoxyacrylic resin and a polyester resin, and may be further incorporated with a cross-linking agent. As the epoxy resin, any resins can be used without regard to types. For example, in the case of bisphenols, A-type, F-type and AD-types are available and any of these can be used. However, taking account of coating film performance and coating properties, those having an appropriate molecular weight according to types must be used. For example, in the case of bisphenol-A, resins with a number average molecular weight of less than 2,000 may make coating film strength insufficient to cause a break of coating films when the coated metal sheet is worked into positive electrode cans by deep drawing, and resins with a number average molecular weight of more than 15,000 may make it necessary to use a solvent in a large quantity to have a viscosity suitable for coating, and may result in an extreme decrease in solid contents to make it difficult to provide the desired coating film thickness in the first coating.

The acrylic resin of the epoxy-acrylic resin may be either thermoserring or thermoplastic so long as it is compatible with epoxy resins. It is suitable to use a epoxy-acrylic resin having a number average molecular weight of from 2,000 to 15,000, and preferably from 8,000 to 12,000. If its number average molecular weight is smaller than 2,000, the coating film may exhibit a poor adhesion when worked, and if it is more than 15,000, the coating properties may become poor similarly to the case of sole use of the epoxy resin. A good coating film adhesion can be achieved when the ratio of epoxy resin to acrylic resin is controlled in the range of from 100/5 to 100/50.

As for the polyester resin, any polyester resins can be used so long as they are linear high-molecular polyesters. It is suitable to use a polyester resin having a number average molecular weight of from 2,000 to 40,000, and preferably from 5,000 to 30,000. If its number average molecular weight is smaller than 2,000, the coating film may exhibit a poor adhesion when worked, and if it is more than 40,000, the resin may have a poor solubility and hence the coating properties may become poor similarly to the case of sole use of the epoxy resin.

The cross-linking agent is optionally incorporated in order to balance the hardness and workability of coating films. It is suitable to incorporate it in an amount of from 0 to 50 parts by weight, and preferably from 0 to 30 parts by weight, based on 100 parts by weight of the resin. Its use in an amount more than 50 parts by weight may make coating film hardness higher to cause a lowering of coating film adhesion when worked. The crosslinking agent may include melamine resins such as butylate melamine and methylated melamine, and polyisocyanate compounds of block or non-block types, any of which are suitable and may be used in combination.

As the conductive agent, graphite powder or carbon black may be used alone or the both may be used in combination. Such a conductive agent has been also mixed in conductive coating compositions used to coat positive electrode cans, but mixed in an amount as large as 100 to 300 parts by weight based on 100 parts by weight of resin as previously stated. This is because such coating compositions are intended to coat positive electrode cans and the workability of coating films has not come into question so long as the resistance of coating films can be made smaller. However, in the case of coating films of coated metal sheets, mixing the cross-linking agent in such a large amount may lower the workability of coating films to cause separation of coating films when the coated metal sheet is worked into positive electrode cans by deep drawing. On the other hand, mixing the conductive agent in a small amount may bring about an improvement in the workability of coating films, but makes it impossible to obtain the desired conductivity. Accordingly, the present inventors have made studies on methods by which the conductive agent is mixed in a small amount while ensuring conductivity. As a result, they have discovered that the graphite powder may be made flaky and carbon black with a large resin absorptivity may be used.

The graphite powder is made flaky to have an aspect ratio of not less than 50, end preferably not less than 100. An attempt to incorporate graphite powder having an aspect ratio of less then 50 to obtain the desired conductivity makes it necessary to increase the amount of the graphite powder, so that coating films may separate when worked by deep drawing. Meanwhile, if the graphite powder has an average particle diameter larger then 50 μm, the coating films may come off because of the draw the coating films undergo when worked by deep drawing and also the graphite powder must be incorporated in a large amount in order to obtain the desired conductivity, causing a lowering of the drawing workability of coating films. Hence, the graphite powder must have an average particle diameter not larger than 50 μm. When conductivity and coating properties are taken into account, this average particle diameter may preferably be not larger than 10 μm. Also, the graphite powder should have a purity of not less than 95%, and preferably not less than 99%. If the purity is less than 95%, impurities contained may cause self-discharge.

As the carbon black, carbon black having an oil absorption as measured by JIS K 5101-19 using DBP in place of linseed oil (hereinafter "DBP oil absorption"), of not less than 250 ml/100 g is used in order to make it possible to ensure the desired conductivity by its incorporation in a small quantity. Use of carbon black having an oil absorption less than the above value makes it necessary to incorporate it in e large quantity in order to ensure the conductivity, resulting in a large proportion of carbon black with respect to the resin, so that the coating films may have e low adhesion to cause separation of coating films when worked by drawing. If it is incorporated in a quantity decreased so as not to cause separation of coating films, it becomes impossible to ensure the conductivity.

The graphite powder and the carbon black may preferably be incorporated in an amount falling in the range defined, as shown in FIG. 1, by straight lines connecting the respective proportions (including straight lines) of 20:0 and 100:0, 100:0 and 50:15, 50:15 and 0:20, 0:20 and 0:5, and 0:5 and 20:0, as graphite powder:carbon black proportions in parts by weight indicated by rectangular coordinates. In the region-A outside this range, no desired conductivity can be obtained. In the region-B also, coating films may separate when worked by drawing. In a more preferred range, the graphite powder may be in the range of from 30 to 70 parts by weight, and the carbon black from 2 to 7 parts by weight, based on 100 parts by weight of the resin.

Figure 2:
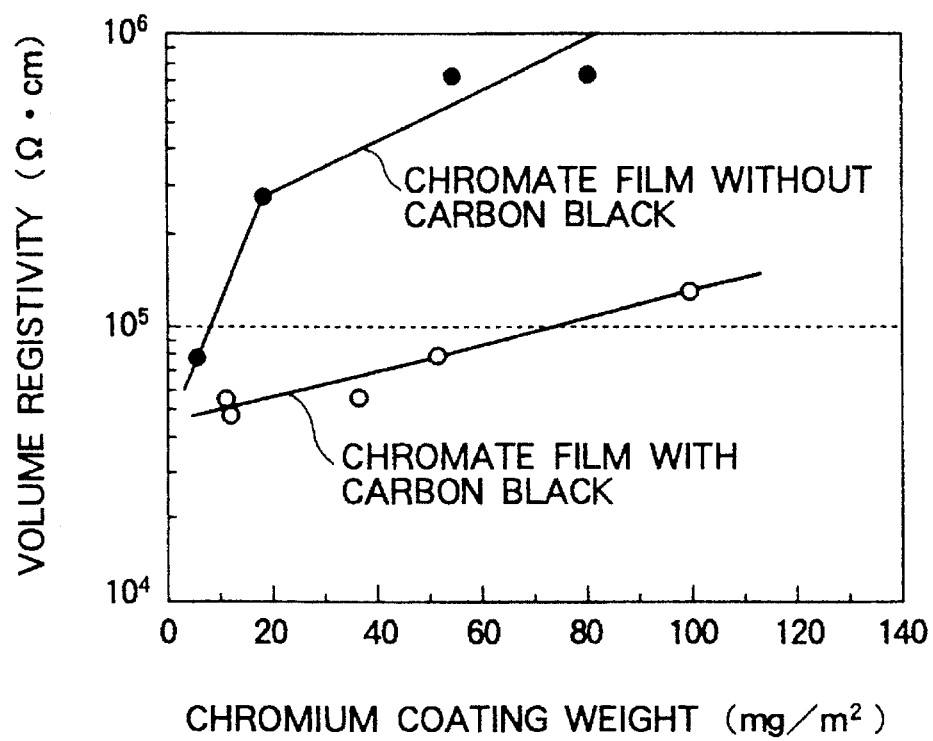
FIG. 2 is a graph showing the relationship between chromate coating weight of chromate film on a coated metal sheet and volume resistivity of the coated metal sheet having been worked into positive electrode cans.

The coated metal sheet of the present invention is provided with a chromate film between the metal sheet and the conductive coating film in order to increase adhesion of the conductive coating film to prevent coating films from separating when worked into positive electrode cans by drawing. The chromate film thus provided between them may also bring about a more improvement in corrosion resistance than in the case when positive electrode cans have only conductive coating films. However, chromate films commonly have a poor conductivity. Hence, when the coated metal sheet is worked into positive electrode cans and thereafter they are made up to alkaline dry cells, formation of the chromate film in a large coating weight may result in a poorer short-circuit current than conventional positive electrode cans obtained by post-coating cold-rolled steel sheet or Ni-coated steel sheet cans with conductive coating compositions. FIG. 2 shows the relationship between chromate coating weight on a coated metal sheet and volume resistivity of the coated metal sheet having been worked into positive electrode cans; the coated metal sheet being obtained by coating a cold-rolled steel sheet with a coating type chromating solution containing 70 g/lit. of $CrO_3$, 40% of trivalent chromium based on the whole chromium, 2.5% of silica and 4% of acrylic emulsion resin or a chrometing solution further mixed with 30 parts by weight of carbon black based on the weight of solid contents of the above chrometing solution, followed by drying without washing with water, and then coating the resulting steel sheet with an epoxy resin coating composition containing 50 phr of graphite powder, followed by drying. In the case of the chromate film incorporated with no carbon black, the volume resistivity is lower than the volume resistivity $1 \times 10^5$ $\Omega \cdot cm$ of conventional positive electrode cans when the chromium coating weight is more than 10 mg/m².

Hence, the chromate film of the coated metal sheet must be made to have a chromium coating weight of not more than 10 mg/m², in order to promise the same performance as conventional positive electrode cans. If on the other hand it has a chromium coating weight less than 5 mg/m², the coating films tends to separate when worked by drawing. Hence, in order to impart corrosion resistance and conductivity by providing the chromate film alone, the chromium coating weight must be controlled in the range of from 5 to 10 mg/m². It, however, is difficult as a matter of fact to control the chromium coating weight within such a narrow range.

Now, the present inventors have contrived a method for incorporating carbon black into chromate films as a means for providing conductivity even when the chromium coating weight is made larger than 10 mg/m² in the state of a coated metal sheet. As shown in FIG. 2, when carbon black is incorporated into chromate films even in an amount of 70 mg/m², the volume resistivity can be maintained at the same level as the volume resistivity $1 \times 10^5$ $\Omega \cdot cm$ of conventional positive electrode cans. However, when it is incorporated in an amount more than 70 mg/m², the chromate film itself tends to cause its cohesive failure, so that separation of coating films tends to occur. However, even when carbon black is incorporated into the chromate film, there is no difference in respect of the fact that the coating films tend to separate when worked by drawing so long as the chromium coating weight is less than 5 mg/m². For this reason, the chromate film is controlled to have a chromium coating weight of from 5 to 70 mg/m². Incidentally, the reason why carbon black is used as the conductive agent is that graphite powder has so large a specific gravity that it may easily settle to the bottom when mixed into a chromating solution and can be dispersed in the chromate film with difficulty.

Figure 3:
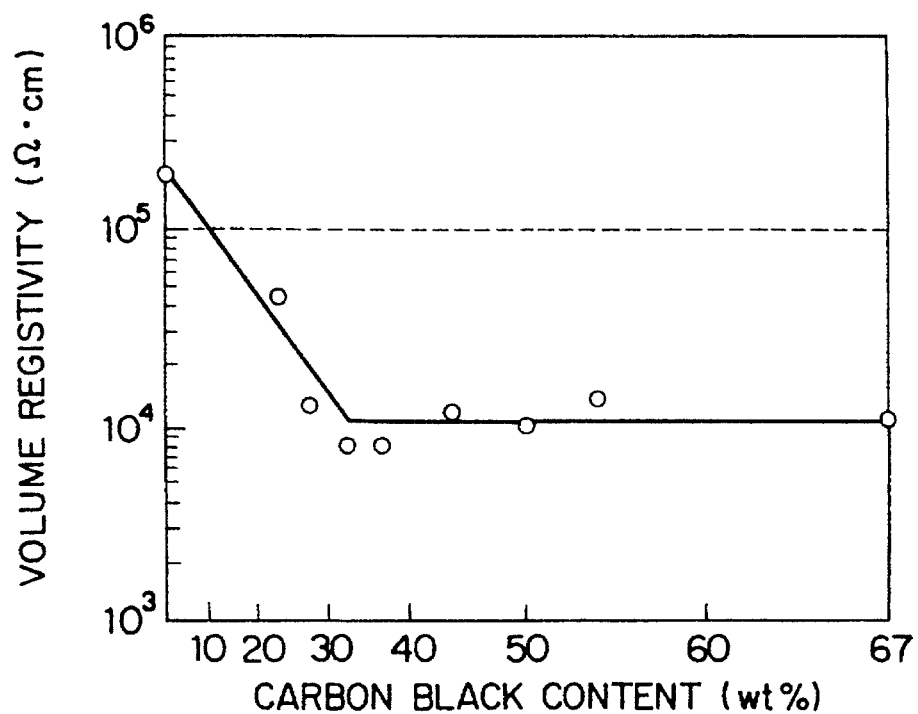
FIG. 3 is a graph showing the relationship between carbon black content of chromate film on a coated metal sheet having a chromate film containing carbon black, and its volume resistivity.

The chromate film in which the carbon black has been dispersed may be formed in the following way: Apart from the chromating solution, an aqueous carbon black dispersion is prepared by dispersing carbon black in water using a surface active agent, followed by addition of the chromating solution to the dispersion, and the resulting mixture is coated on the metal sheet. FIG. 3 shows the relationship between carbon black content on a coated metal sheet and volume resistivity of the coated metal sheet having been worked into positive electrode cans; the coated metal sheet being obtained by coating a cold-rolled steel sheet with a coating type chromating solution containing 70 g/lit. of $CrO_3$, 40% of trivalent chromium based on the whole chromium, 2.5% of silica and 4% of acrylic emulsion resin, further mixed with carbon black, followed by drying without washing with water to form a chromate film having a chromium coating weight of 20 mg/m² and then coating the resulting steel sheet in the same manner as in the case of FIG. 2. The volume resistivity can be made not higher than the volume resistivity $1 \times 10^5$ $\Omega \cdot cm$ of conventional positive electrode cans when the carbon black is mixed in an amount of at least 9% parts the chromate film. In general, the stability of solution is not damaged even when carbon black is mixed in an amount of about 80% by weight of the solid contents of the chromating solution. It, however, is suitable to mix it in an amount of about 9 to 67% by weight of and preferably about 23 to 50% by weight of its addition in a an amount of less than about 9% by weight may result in an unsatisfactory improvement in conductivity of the chromate film as shown in FIG. 3. Its addition in an amount of more than 67% by weight may cause separation of coating films when worked by drawing.

As the chrometing solution, a coating type chrometing solution is used. The chrometing solution of this type may have various compositions. It basically contains 10 to 200 g/lit. of hexevelent chromium in terms of $CrO_3$ and 20 to 60% of trivalent chromium based on the weight of the whole chromium, as well as an inorganic matter such as silica powder or titanium oxide or an organic matter such as water-dispersible resin optionally added. Such a chrometing solution is coated on the metal sheet, followed by drying at 60° C. to 120° C.

To form the chromate film on the metal sheet and to form the conductive coating film on the metal sheet or the metal sheet on which the chromate film has been formed, known processes as exemplified by roll coating, bar coating and spray coating may be used in either case. Before the chromate film is formed, mechanical polishing, alkali degreesing, phosphating and so forth may be applied depending on the type or surface configuration of the metal sheet.

As the metal sheet, it is possible to use cold-rolled sheets, various coated steel sheets such as Ni-coated ones, stainless steel sheets or the like.

EXAMPLES

EXAMPLE 1 & COMPARATIVE EXAMPLE 1

A Ni-coated steel sheet with a sheet thickness of 0.25 mm was subjected to alkali degreesing, phosphating and washing with hot water, and thereafter coated with a coating type chrometing solution containing 70 g/lit. of $CrO_3$, 40% of trivalent chromium based on the whole chromium, 2.54 of silica and 4% of acrylic emulsion resin, to form a chromate film having a chromium coating weight of 10 mg/m² followed by drying. Subsequently on the chromate film thus formed, a coating composition comprising a resin of an epoxy type, an epoxy-acrylic type or a polyester type and 0 to 100 parts by weight of graphite powder with a purity of 99.5%, an aspect ratio of 30 to 100 and an average particle diameter of 5 to 70 μm or 0 to 25 parts by weight of carbon black with a DBP oil absorption of 200 to 500 ml/100 g, or both of these, mixed in the stated amount based on 100 parts by weight of the resin, was coated by means of a bar coater in a dried coating film thickness of 7 μm, followed by baking at a maximum sheet temperature of 215° C. for a drying time of 50 seconds to cure the coating. The conductivity, coating film adhesion, drawing workability and short-circuit current of the resulting coated metal sheet were evaluated in the manner as shown below. In Comparative Example, the above Ni-coated steel sheet was worked into positive electrode cans of AM3 alkaline dry cells, which were thereafter spray-coated with a conductive coating composition in a dried coating film thickness of 10 μm, followed by drying at room temperature to cure the coating. The results are shown in Table 1.

(1) Conductivity test:

Volume resistivity of each coated metal sheet (a flat sheet having not been worked into positive electrode cans) was measured according to JIS K 6911. An instance where the volume resistivity (Ω·cm) was less than $5\times10^4$ was evaluated as "AA"; not less than $5\times10^4$, as "A"; less than $1\times10^5$, as "B"; and not less than $1\times10^5$, as "C".

(2) Coating film adhesion test:

A cross-cut test, cross-cut Erichsen test and a du Pont impact test were carried out according to JIS K 5400, and the state of separation of coating films in these tests was totally evaluated as "AA" (good adhesion), "A", "B" or "C" (poor adhesion).

Figure 4:
FIG. 4 is a perspective view of an alkaline dry cell positive electrode can produced in Examples.

(3) Drawing workability test:

Each coated metal sheet was worked into positive electrode cans (blanking diameter: 55 mm; final diameter: 13.85 mm) of AM3 alkaline dry cells as shown in FIG. 4, and the state of separation of coating films was evaluated as "AA" (good adhesion), "A", "B" or "C" (poor adhesion).

(4) Short-circuit current test:

The positive electrode cans prepared in the above drawing workability test were left to stand in an environment of a temperature of 60° C. and a relative humidity of 90% for 20 days, and an instance where the short-circuit current retension was not less than 95% was evaluated as "AA"; not less than 90% to less than 95% as "A", and less than 90% as "C".

TABLE 1

| | | Conductive agents | | | | | Conductive coating | | | |
|---|---|---|---|---|---|---|---|---|---|---|
| | | Graphite powder | | | Carbon black | | film performance | | | |
| Sample No. | Coating resin | Particle diam. | Aspect ratio | Amount | Oil absorption | Amount | (1) | (2) | (3) | (4) |
| Example | | | | | | | | | | |
| 1 | Epoxy | 5 | 100 | 50 | 250 | 5 | AA | AA | AA | AA |
| 2 | Epoxy/acrylic | 5 | 100 | 50 | 250 | 5 | AA | AA | AA | AA |
| 3 | PE | 5 | 100 | 50 | 250 | 5 | AA | AA | AA | AA |
| 4 | Epoxy | 10 | 50 | 30 | 350 | 10 | AA | AA | AA | AA |
| 5 | Epoxy | — | — | 0 | 250 | 20 | AA | A | A | A |
| 6 | Epoxy | 10 | 100 | 40 | 350 | 10 | AA | AA | AA | AA |
| 7 | Epoxy | 30 | 50 | 60 | 500 | 2 | AA | AA | AA | AA |
| 8 | Epoxy | 30 | 70 | 80 | 500 | 1 | AA | A | A | A |
| 9 | Epoxy | 50 | 70 | 100 | — | 0 | AA | A | A | A |
| Comparative Example | | | | | | | | | | |
| 1 | Epoxy | 5 | 100 | 10 | — | 0 | C | AA | AA | AA |
| 2 | Epoxy | — | — | 0 | 250 | 3 | C | AA | AA | AA |
| 3 | Epoxy | 5 | 100 | 10 | 250 | 2 | C | AA | AA | AA |
| 4 | Epoxy | 5 | 100 | 50 | 250 | 18 | AA | C | C | C |
| 5 | Epoxy | 5 | 100 | 80 | 250 | 10 | AA | C | C | C |
| 6 | Epoxy | 5 | 30 | 100 | 350 | 5 | A | C | C | C |
| 7 | Epoxy | 5 | 30 | 50 | 350 | 10 | C | AA | AA | AA |
| 8 | Epoxy | 70 | 50 | 50 | 350 | 20 | A | C | C | C |
| 9 | Epoxy | 70 | 50 | 50 | 250 | 5 | C | A | A | A |
| 10 | Epoxy | — | — | 0 | 200 | 20 | C | A | A | A |
| 11 | Epoxy | — | — | 0 | 200 | 25 | A | C | C | C |
| 12 | Epoxy | 5 | 100 | 50 | 200 | 20 | AA | C | C | C |
| 13* | PVC | 10 | 30 | 250 | 200 | 10 | AA | — | — | AA |

*Post-coated positive electrode can
PE: Polyethylene, PVC: Polyvinyl chloride
(1): Conductivity TABLE 1-continued

| | | Conductive agents | | | | | Conductive coating | | | |
|---|---|---|---|---|---|---|---|---|---|---|
| | | Graphite powder | | | Carbon black | | film performance | | | |
| Sample No. | Coating resin | Particle diam. | Aspect ratio | Amount | Oil absorption | Amount | (1) | (2) | (3) | (4) |

(2): Coating film adhesion
(3): Drawing workability
(4): Sort-circuit current
Remarks:
1) The epoxy resin is bisphenol-A epoxy resin PHENOTOTO YP-50PK-35, available from Toto Chemical Co., Ltd. The epoxy/acrylic resin is a mixture of bisphenol-A epoxy resin PHENOTOTO YU-100, available from Toto Chemical Co., Ltd. and polymethyl methacrylate resin DIANAL LR-269, available from Mitsubishi Rayon Co., Ltd. The polyester resin is linear high-molecular polyester resin BYLON 59CS, available from Toyobo Co., Ltd.
2) In each resin of the epoxy resin, the epoxy/acrylic resin and the polyester resin, methylated melamine resin NIKALUCK MW-24X, available from Sanwa Chemical Co., Ltd., has been mixed as a cross-linking agent in an amount of 10 parts by weight based on 100 parts by weight of the resin.
3) The particle diameter is indicated as average particle diameter (μm): the amount, in parts by weight; and the oil absorption, as DBP oil absorption (ml/100 g).

EXAMPLE 2 & COMPARATIVE EXAMPLE 2

In Example 1 and Comparative Example 1 each, the coating type chromating solution was replaced with a chromating solution having the same composition but further mixed with carbon black, to form a chromate film containing carbon black, having a chromium coating weight of 1 to 100 mg/m$^2$. The coated metal sheets thus obtained were tested by the same tests as in Example 1 and Comparative Example 1 to examine their performance. The structure of each coated metal sheet is shown in Table 2, and the performance thereof in Table 3.

TABLE 2

| | Chromate film | | Conductive agent | | |
|---|---|---|---|---|---|
| Sample No. | Carbon black content (wt %) | Chromium coating weight (mg/m$^2$) | Coating resin | Graphite powder (pbw) | Carbon black (pbw) |
| Example | | | | | |
| 21 | 17 | 5 | Epoxy | 50 | 5 |
| 22 | 41 | 70 | Epoxy | 50 | 5 |
| 23 | 38 | 20 | Epoxy/acrylic | 50 | 5 |
| 24 | 33 | 30 | Polyester | 50 | 5 |
| 25 | 33 | 40 | Epoxy | 0 | 20 |
| 26 | 44 | 10 | Epoxy | 40 | 10 |
| 27 | 50 | 50 | Epoxy | 60 | 2 |
| 28 | 66 | 30 | Epoxy | 80 | 1 |
| 29 | 67 | 10 | Epoxy | 100 | 0 |
| Comparative Example | | | | | |
| 21 | 33 | 1 | Epoxy | 50 | 5 |
| 22 | 33 | 100 | Epoxy | 50 | 5 |
| 23 | 33 | 50 | Epoxy | 10 | 2 |
| 24 | 23 | 10 | Epoxy | 50 | 18 |
| 25 | 23 | 20 | Epoxy | 80 | 10 |
| 26 | 0 | 20 | Epoxy/acrylic | 50 | 5 |
| 27 | 0 | 100 | Epoxy | 50 | 5 |

Remarks:
1) The graphite powder used has an average particle diameter of 5 μm and an aspect ratio of 100, and the carbon black used has a DBP oil absorption of 500 ml/100 g.

TABLE 3

| Sample No. | Conductive coating film performance | | | |
|---|---|---|---|---|
| | Conductivity | Coating film adhesion | Drawing workability | Short-circuit current |
| Example | | | | |
| 21 | AA | AA | AA | AA |
| 22 | AA | AA | AA | AA |
| 23 | AA | AA | AA | AA |
| 24 | AA | AA | AA | AA |
| 25 | AA | A | A | A |
| 26 | AA | AA | AA | AA |
| 27 | AA | AA | AA | AA |
| 28 | AA | A | A | A |
| 29 | AA | A | A | A |
| Comparative Example | | | | |
| 21 | AA | B | C | C |
| 22 | AA | B | C | C |
| 23 | C | AA | AA | C |
| 24 | AA | C | C | C |
| 25 | AA | C | C | C |
| 26 | C | AA | AA | AA |
| 27 | C | B | C | C |

We claim:

1. A coated metal sheet for alkaline dry cell positive electrode cans, comprising a metal sheet having a chromate film and covered thereon with a coating film mainly composed of at least one of an epoxy resin, an epoxy-acrylic resin a polyester resin, an epoxy resin incorporated with a crosslinking agent, an epoxy-acrylic resin incorporated with a crosslinking agent, or a polyester resin incorporated with a crosslinking agent, the coating film containing a conductive agent comprising at least one of graphite powder having a purity of not less than 95%, having been made flaky to have an aspect ratio of not less than 50 and having an average particle diameter of not larger than 50 µm or carbon black having an oil absorption of not less than 250 ml/100 g as measured using DBP, said conductive agent being contained in an amount falling in the range defined by straight lines connecting the respective proportions of 20:0 and 100:0, 100:0 and 50:15, 50:15 and 0:20, 0:20 and 0:5, and 0:5 and 20:0, as graphite powder: carbon black proportions in parts by weight indicated by rectangular coordinates.

2. The coated metal sheet for alkaline dry cell positive electrode cans according to claim 1, wherein said chromate film is a chromate film having a chromium coating weight of 5 to 70 mg/m$^2$, formed by coating a chromating solution containing carbon black in an amount from 9 to 67 by weight based on the solid content of the chromating solution.

3. An alkaline dry cell positive electrode can comprising a dry cell positive electrode can having a chromate film on the inside surface thereof and, formed on the chromate film, a coating film containing carbon black and graphite powder; the can being produced by working the coated metal sheet according to claim 1 by drawing.

4. A coated metal sheet according to claim 1, wherein the coating film comprises an epoxy resin selected from A-type, F-type, and AD-type bisphenols having a number average molecular weight between 2,000 and 15,000.

5. A coated metal sheet according to claim 1, wherein the coating film comprises an epoxy-acrylic resin, wherein the acrylic portion is thermosetting or thermoplastic and has a number average molecular weight of from 2,000 to 15,000.

6. A coated metal sheet according to claim 5, wherein the acrylic portion has a number average molecular weight of from 8,000 to 12,000.

7. A coated metal sheet according to claim 1, wherein the coating film comprises an epoxy-acrylic resin and the ratio of epoxy resin to acrylic resin in the epoxy-acrylic resin is from 100:5 to 100:50.

8. A coated metal sheet according to claim 1, wherein the coating film comprises a polyester resin which is a linear high molecular weight polyester having a number average molecular weight of from 2,000 to 40,000.

9. A coated metal sheet according to claim 8, wherein the number average molecular weight is from 5,000 to 15,000.

10. A coated metal sheet according to claim 1, wherein the coating film includes a cross-linking agent which is present in an amount from 0 to 50 parts by weight based on the weight of the epoxy resin, the epoxy-acrylic resin or the polyester resin.

11. A coated metal sheet according to claim 10, wherein the cross-linking agent is present in an amount from 0 to 30 parts by weight based on the weight of the epoxy resin, the epoxy-acrylic resin, or the polyester resin.

12. A coated metal sheet according to claim 1, wherein the coating film includes a cross-linking agent which is selected from melamine resins and polyisocyanate compounds.

13. A coated metal sheet according to claim 2, wherein the chromating solution contains 23 to 50 % by weight carbon black based on the solid content of the chromating solution.

14. A coated metal sheet according to claim 1, wherein the graphite powder is present in an amount from 30 to 70 parts by weight and the carbon black is present in an amount from 2 to 7 parts by weight based on 100 parts by weight of the epoxy resin, the epoxy-acrylic resin, or the polyester resin.

* * * * *